(No Model.) 9 Sheets—Sheet 1.
J. W. DARLEY, Jr.
APPARATUS FOR INDICATING AND SIGNALING SPEED OF VEHICLES.
No. 539,381. Patented May 14, 1895.
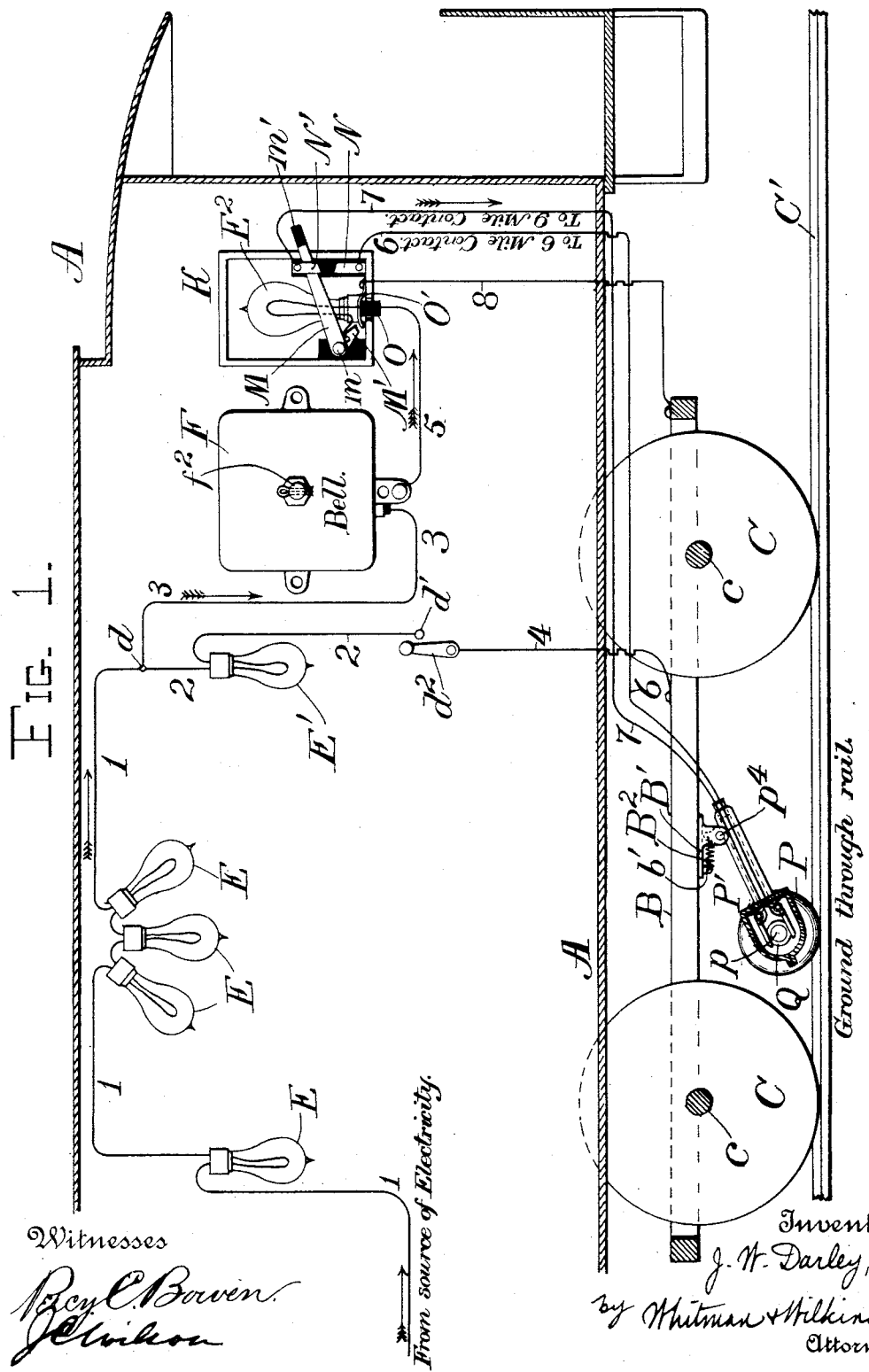

(No Model.) J. W. DARLEY, Jr. 9 Sheets—Sheet 2.
APPARATUS FOR INDICATING AND SIGNALING SPEED OF VEHICLES.
No. 539,381. Patented May 14, 1895.
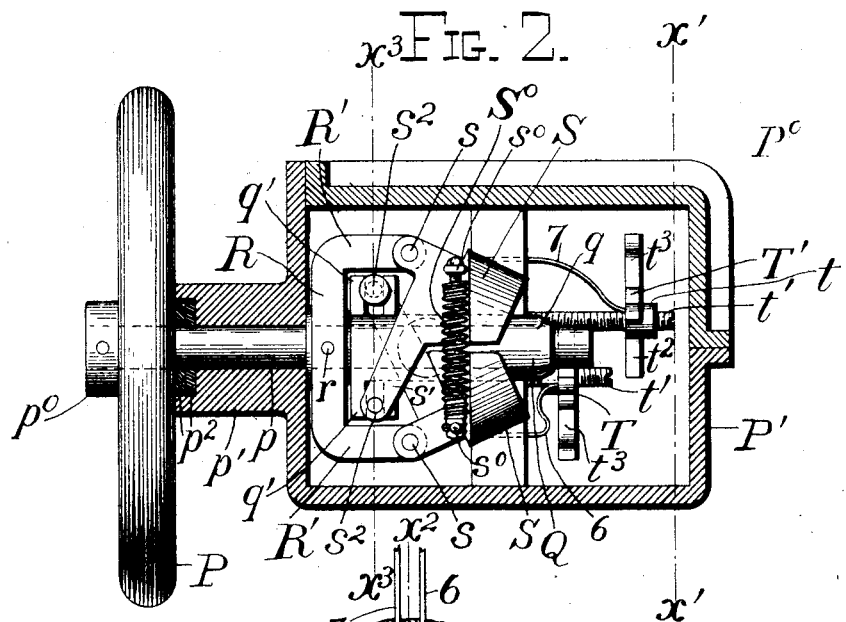
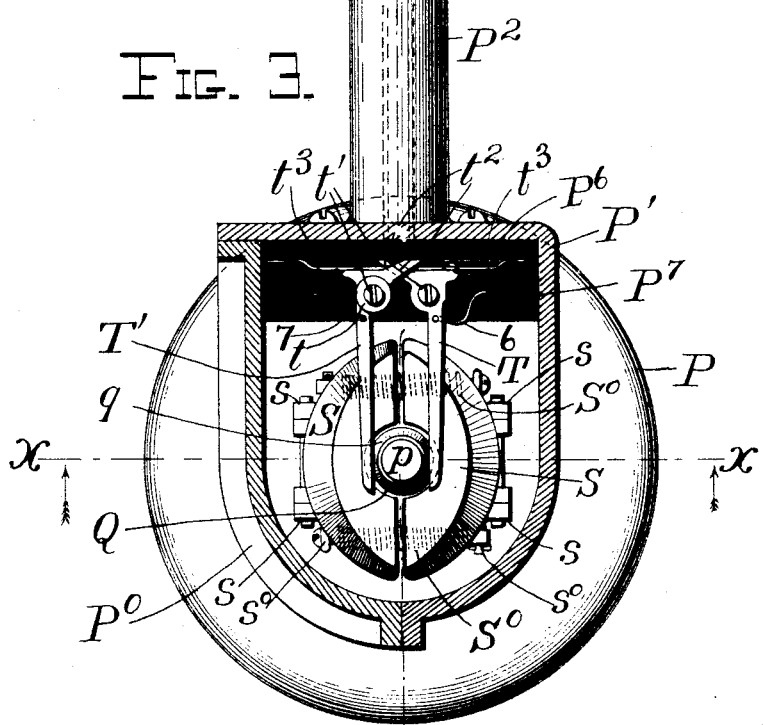

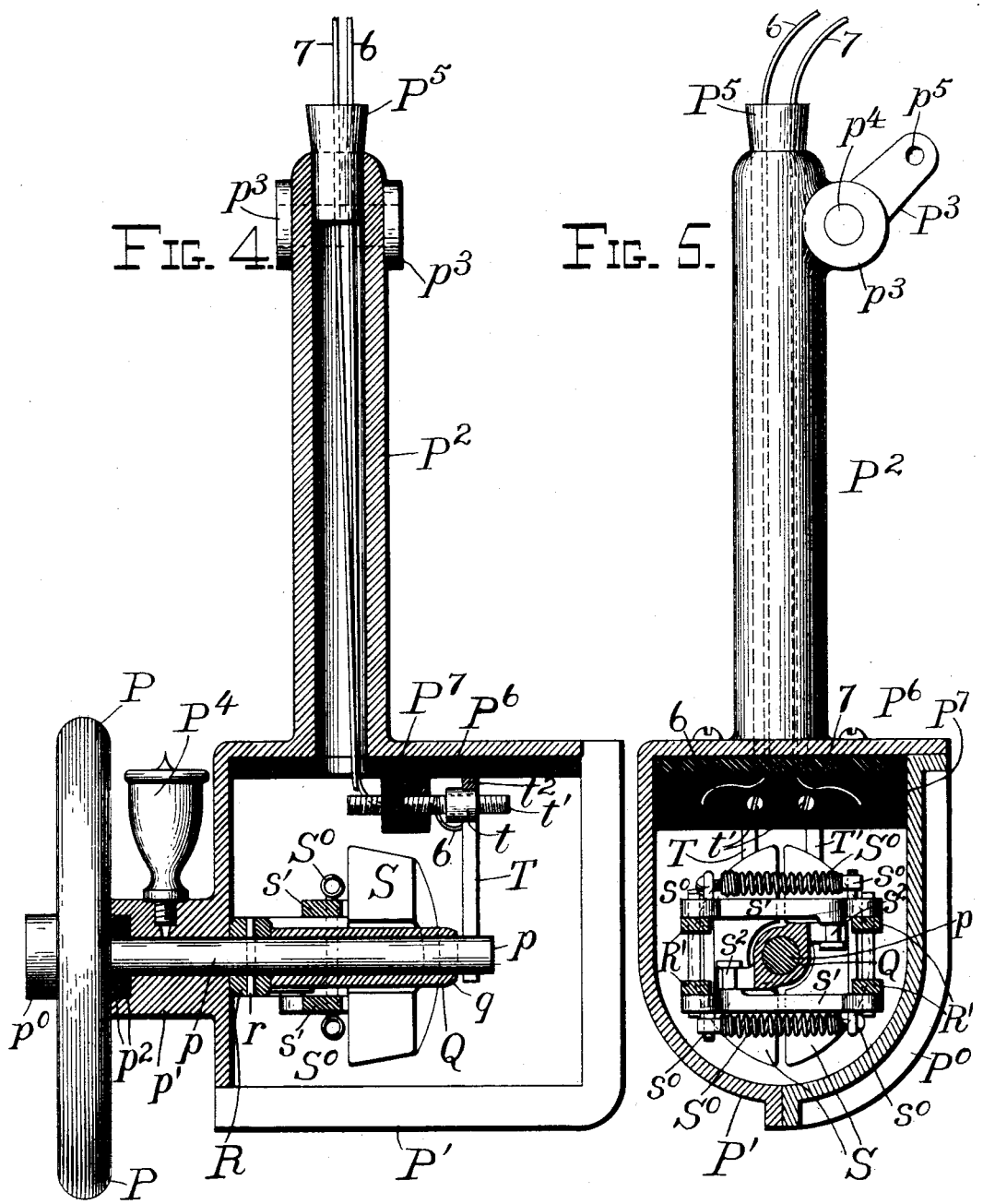

(No Model.) 9 Sheets—Sheet 4.
J. W. DARLEY, Jr.
APPARATUS FOR INDICATING AND SIGNALING SPEED OF VEHICLES.
No. 539,381. Patented May 14, 1895.
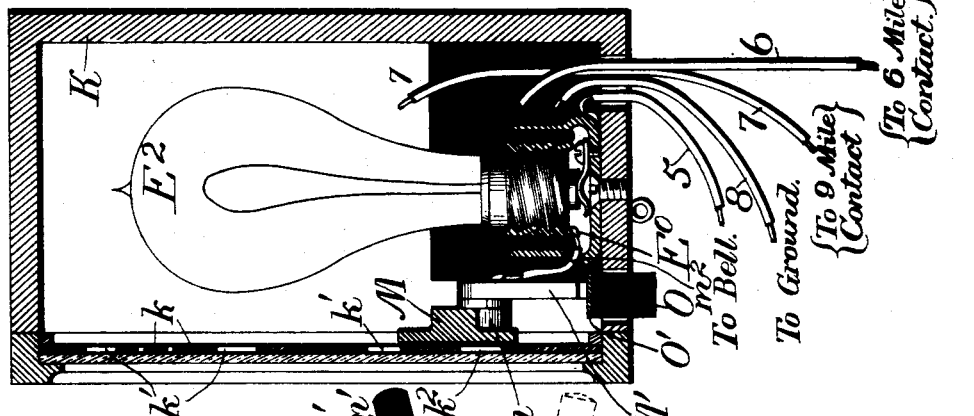
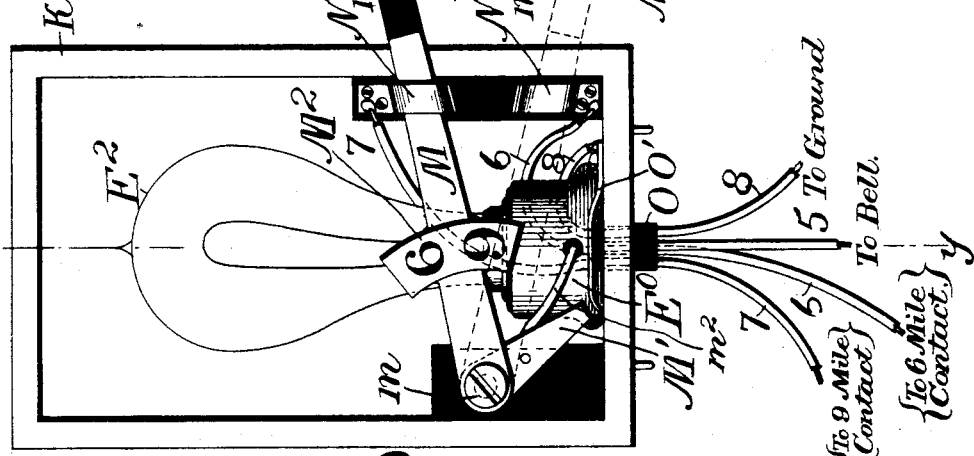
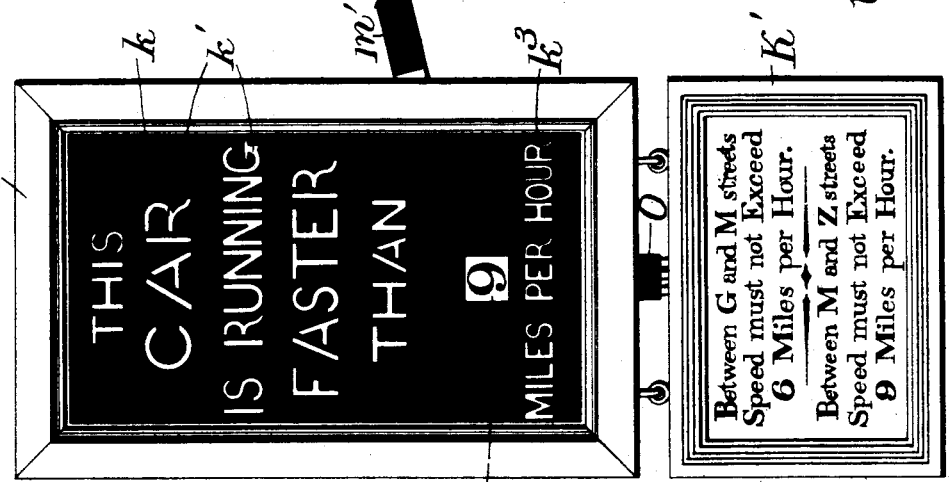

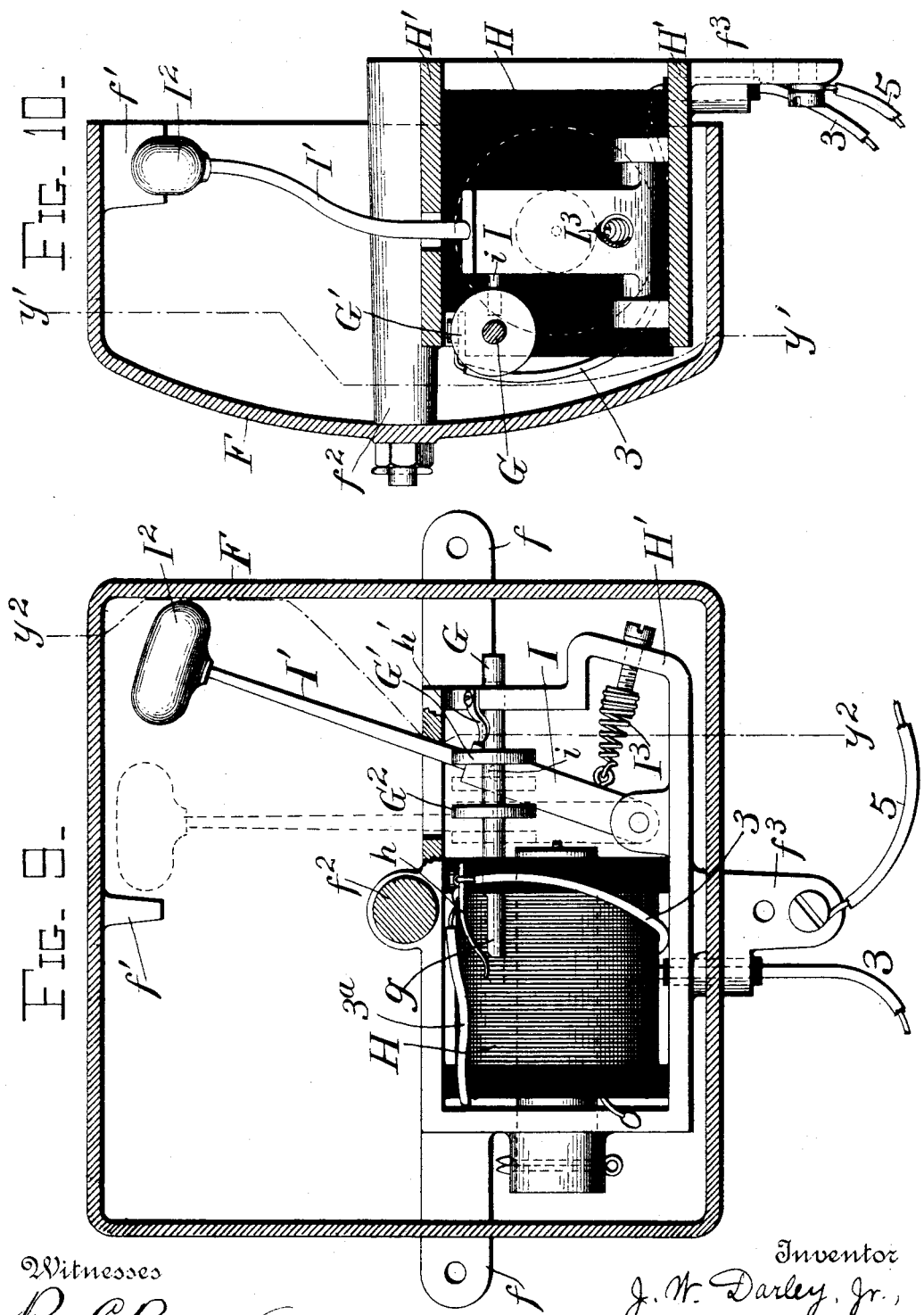

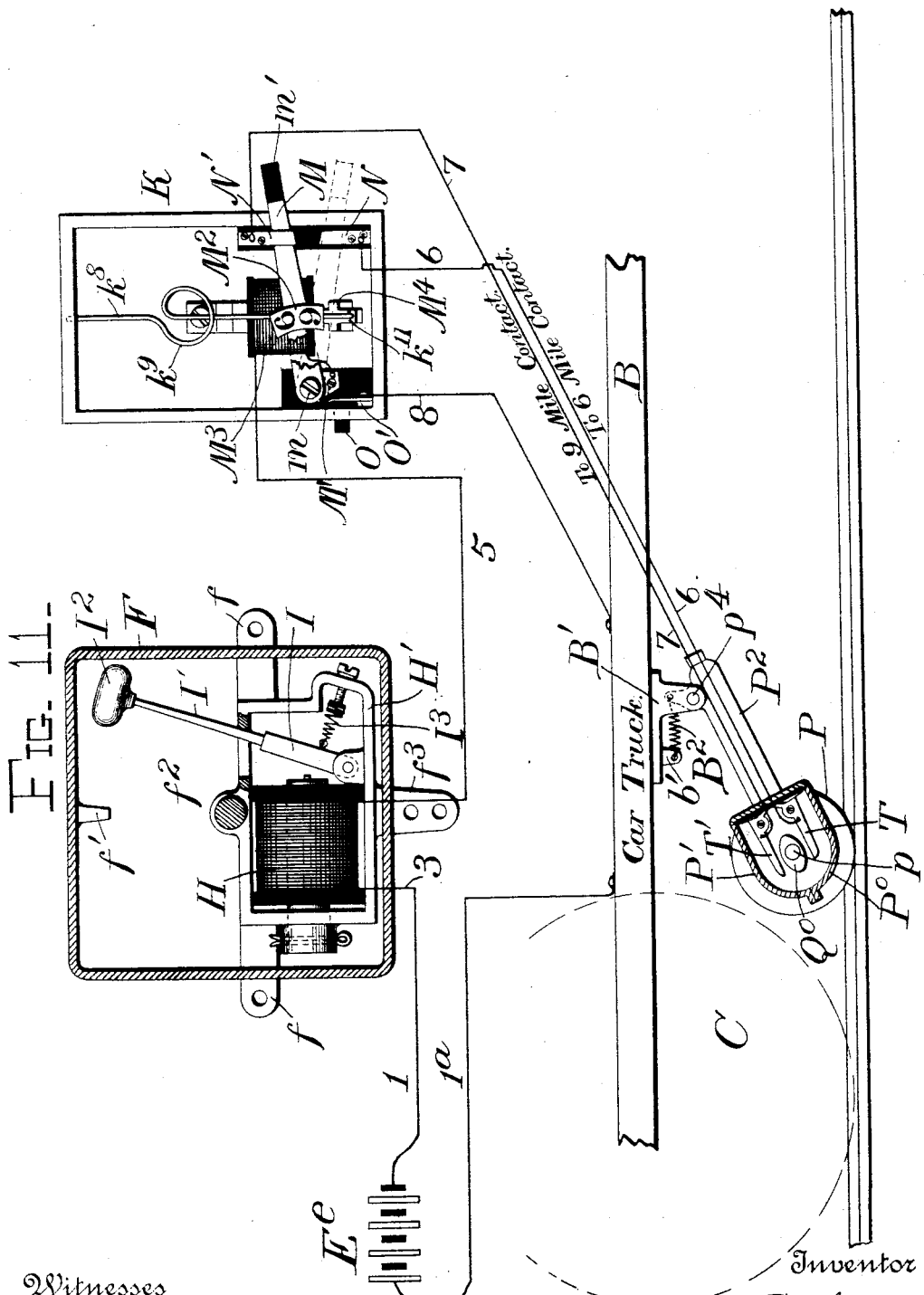

(No Model.) 9 Sheets—Sheet 7.
J. W. DARLEY, Jr.
APPARATUS FOR INDICATING AND SIGNALING SPEED OF VEHICLES.
No. 539,381. Patented May 14, 1895.
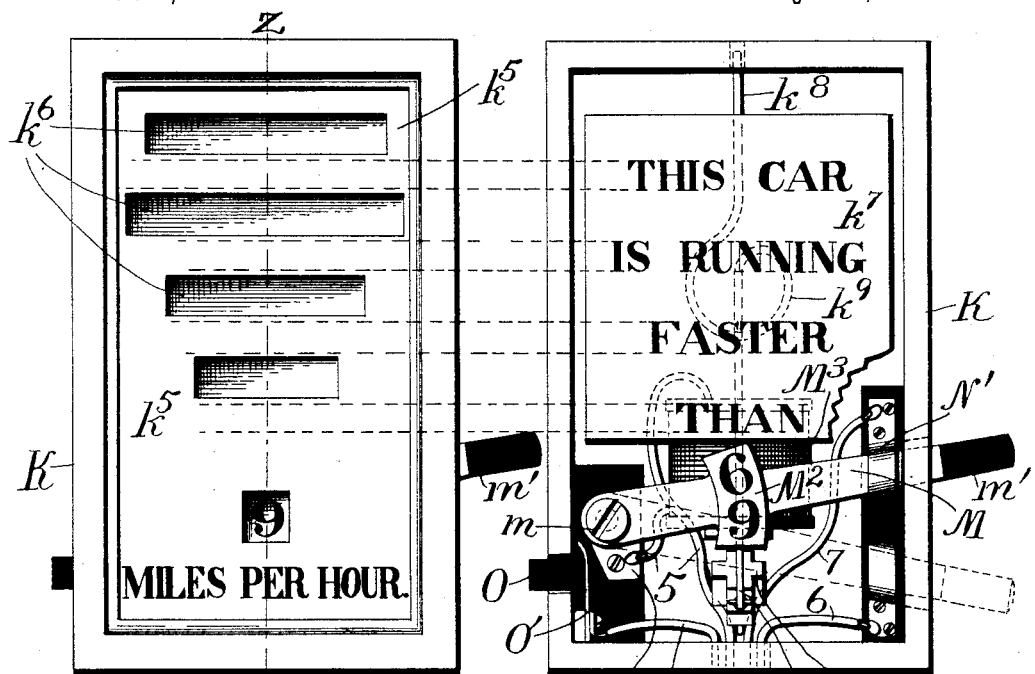

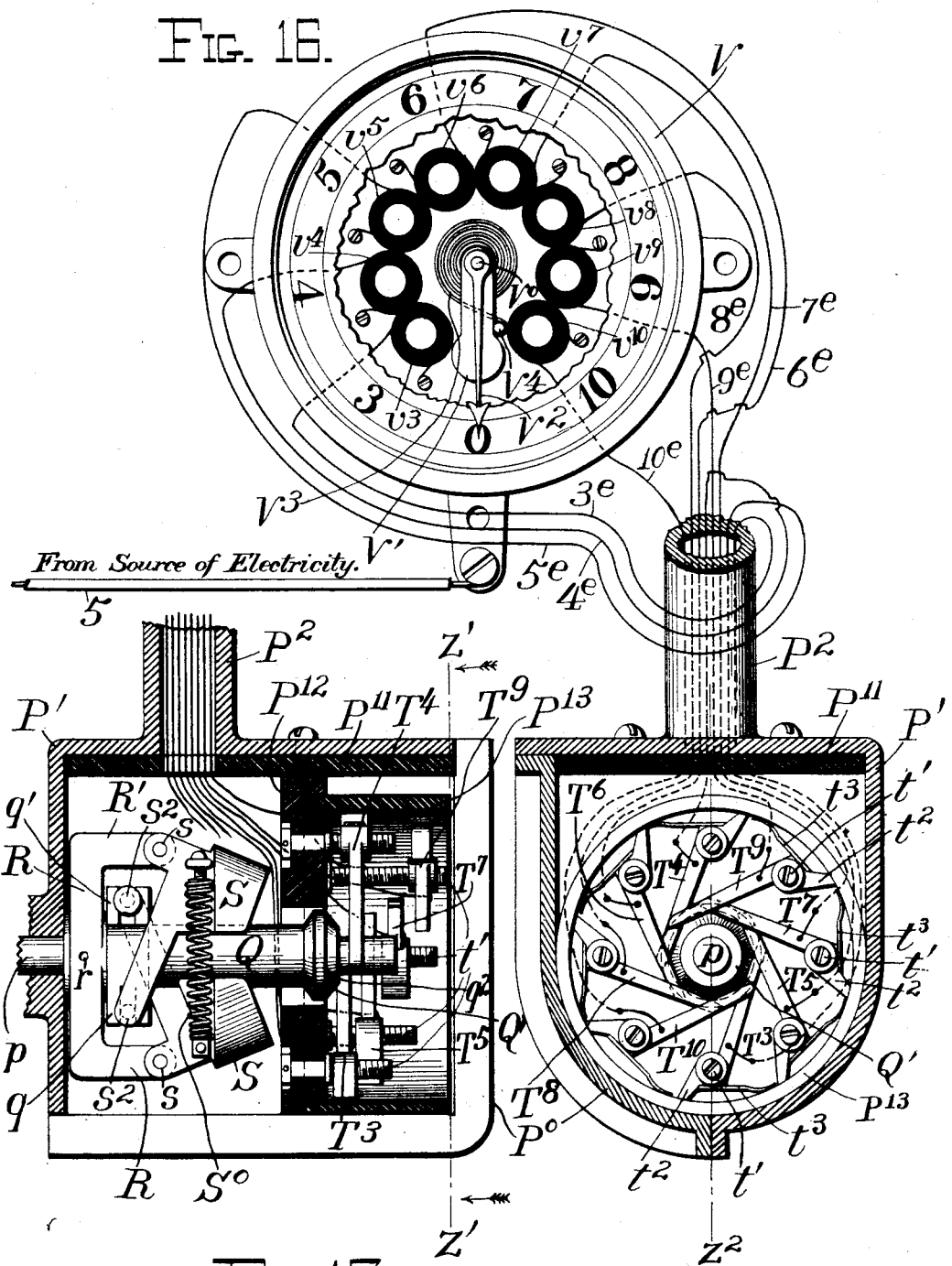

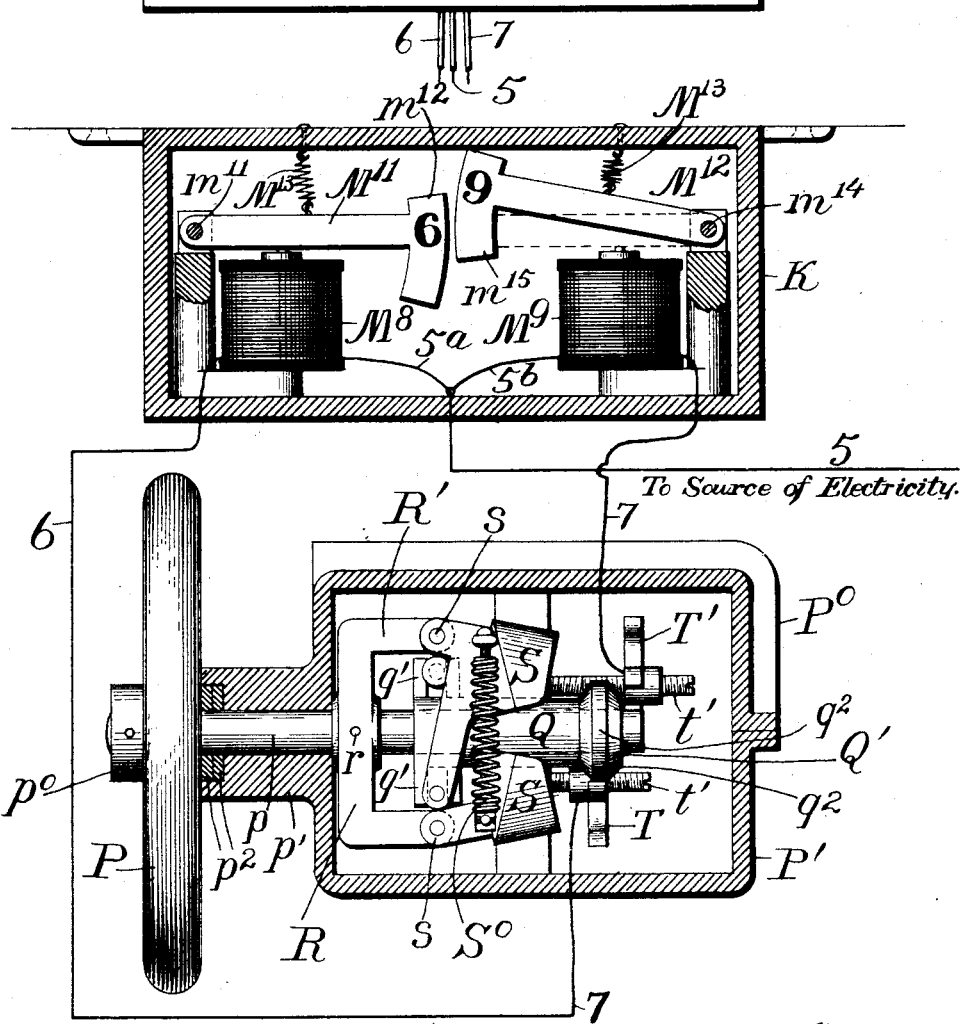

UNITED STATES PATENT OFFICE.

JOHN W. DARLEY, JR., OF BALTIMORE, MARYLAND, ASSIGNOR OF ONE-HALF TO MICHAEL HOLZMAN, PHILIP HAMBURGER, AND LEON HAMBURGER, OF SAME PLACE.

APPARATUS FOR INDICATING AND SIGNALING SPEED OF VEHICLES.

SPECIFICATION forming part of Letters Patent No. 539,381, dated May 14, 1895.

Application filed March 29, 1894. Serial No. 505,606. (No model.)

*To all whom it may concern:*

Be it known that I, JOHN W. DARLEY, Jr., a citizen of the United States, residing at Baltimore, in the State of Maryland, have invented certain new and useful Improvements in Apparatus for Signaling the Speed of Railway-Cars; and I do hereby declare the following to be a full, clear, and exact description of the invention, such as will enable others skilled in the art to which it appertains to make and use the same.

My invention relates to improvements in apparatus for signaling the speed of railway cars, and while applicable to cars of any description carrying or connected to a source of electricity, it is especially adapted for use in street railway cars of the trolley or storage battery type.

The said invention consists of certain novel features hereinafter described and claimed.

Reference is had to the accompanying drawings, in which the same letters and numerals indicate the same parts throughout the several views.

Figure 1 represents a longitudinal section through one end of a car and illustrates diagrammatically the use of the herein-described signal apparatus. Fig. 2 represents a section along the line $x\ x$ of Fig. 3 through the box containing the centrifugal governors for indicating the speed, the trailing wheel for operating said governor being shown in elevation. Fig. 3 represents a section along the line $x'\ x'$ of Fig. 2 and looking to the left. Fig. 4 represents a section along the line $x^2\ x^2$ of Fig. 3. Fig. 5 represents a section along the line $x^3\ x^3$ of Fig. 2 and looking to the right. Fig. 6 represents a front view of the speed-indicator placed in the car. Fig. 7 represents the device shown in Fig. 6 with the indicating-card removed. Fig. 8 represents a section of the device shown in Fig. 7 along the line $y\ y$ of the said figure and looking to the left. Fig. 9 represents a section of the bell and attachments, the said section being along the line $y'\ y'$ of Fig. 10. Fig. 10 represents a section of the device shown in Fig. 9 along the line $y^2\ y^2$ of the said figure. Fig. 11 represents a diagrammatic view of a modified form of the speed-signaling apparatus. Fig. 12 represents a front view of the speed-indicator shown in diagram in Fig. 11. Fig. 13 represents a front view of the device shown in Fig. 12 with the front card or face removed. Fig. 14 represents a section of the modified form of indicating apparatus shown in Fig. 12 along the line $z\ z$ of the said figure, and Fig. 15 represents a detail view in section of the magnet and attachments for operating the signal-card shown in Figs. 12 to 14. Fig. 16 represents a diagrammatic view of another modified form of speed-indicating apparatus, and Fig. 17 represents a section of the apparatus shown in Fig. 16 along the line $z^2\ z^2$ of the said figure. Fig. 18 represents still another form of indicator placed in the car, and Fig. 19 represents a diagrammatic view of the apparatus for operating the indicator shown in Fig. 18.

A represents the car body mounted on the trucks B in which the axles $c$ of the wheels C are journaled, which wheels run along the track C', which may be of any desired type.

The numerals wherever used, indicate electrical conducting wires. Thus, in Fig. 1 the wire 1 coming from the source of electricity, passes into any number of lamps E, arranged in series, or in multiple-arc if desired, and reaching the point $d$, the said wire is joined to two similar conductors 2 and 3. The wire 2 enters additional lamp E' (a resistance coil would do as well) and emerging from said lamp terminates in a contact piece $d'$ in juxtaposition to the switch $d^2$ which is connected by means of the wire 4 to the truck B. This truck not being insulated, it will be evident that if the switch $d^2$ be closed, the current from the wire 1, or a large part thereof, will pass through the various lamps to the ground, thus establishing an electric circuit. The other wire 3 leading from the point $d$ passes through the bell F and is electrically connected to the wire 5 which enters the indicator K and may be electrically connected by means of one of the wires 6 or 7 to the ground, as will be hereinafter described.

If the circuit through the wires 2 and 4 be open as shown in Fig. 1, and the circuit through either one of the wires 6 or 7 be closed, it will be seen that the current from the wire 1 will flow through the wire 3, the bell F, the wire 5, the indicator K, and thence by the wire 6 or 7 to the ground. Again, if the switch $d^2$ be closed, only part of the current from the wire 1 will flow through the wires 2 and 4 to the ground, while the resistance indicated by the lamp E', will cause the remainder of the current from the wire 1 to pass through the bell and indicator circuits to the ground, through the wires 6 or 7, should either one of the said wires form a closed circuit. Electrical connection is made between one of these wires 6 and 7 and the ground by the apparatus shown in detail in Figs. 2 to 5. In these figures P represents a trailing wheel made of conducting material, and preferably rounded exteriorly to run in the slot in the rail most commonly in use, but the exterior contour of the said wheel is immaterial. This wheel is held by the collar $p^0$ on the shaft $p$ which is journaled in the sleeve $p'$ attached to or integral with the box P', the upper part of which box is closed by the cap $P^0$. $p^2$ represents two or more washers of felt or other similar material to prevent the oil dripping in from the cup $P^4$ from escaping too rapidly, and also to prevent mud and dust from entering the bearing. This box P' has integral therewith or attached thereto a hollow arm $P^2$ which is pivotally secured at $p^3$ by journals $p^4$ in the frame B' secured beneath the truck B. This hollow arm P is provided with a lever arm $P^3$ perforated as at $p^5$ and engaging the spring $B^2$ secured to the lug $b'$ on the frame B'. This spring $B^2$ thus exerts an initial tension tending to keep the wheel P close down on the track C', thus assisting the weight of the said wheel, and causing it to return more readily to the lowest position after the said wheel strikes any solid matter lying on the said track. The upper end of the hollow arm $P^2$ is closed with a block $P^5$ of insulating material, and the blocks of insulating material $P^6$ and $P^7$ are secured in the upper portion of the box P'. The shaft of spindle $p$ carries a sleeve Q revolubly mounted thereon, and the front end of the said sleeve is made tapering as shown at $q$. The rear end of the said sleeve is provided with slotted lugs $q'$ integral with or attached thereto.

In the rear of the sleeve Q the frame R is rigidly attached to the spindle $p$ as by the pin $r$. This frame is bent forward as at R' to form bearing arms for the pivots $s$ of the bell crank levers S. These levers are weighted at their forward ends, and are drawn together by springs $S^0$ secured to lugs $s^0$ on the said levers. The outer ends of said levers terminate in rollers or cylindrical pins $s^2$ engaging in the slotted lugs $q'$. It will be seen that as the spindle $p$ is rapidly revolved, the weighted levers S will fly outward against the action of the springs $S^0$, causing the studs or rollers $s^2$ to push the sleeve Q forward, and that the faster the spindle $p$ revolves, the farther will the said sleeve be moved forward, or to the right of Figs. 2 and 4.

T and T' represent two contact strips which are pivoted at $t$ on the screws $t'$ by means of which screws the said contact strips may be moved forward or backward in the line of travel of the sleeve Q; the worm of said screws where they enter the block $p^7$ being in the opposite direction to that upon which the contacts T and T' are mounted. The inner ends of these contact pieces or strips are bent to form an arm $t^2$ which arm is normally pressed on the insulating piece $P^6$ by means of the spring $p^3$. It will be obvious that these contact pieces T and T' may be so adjusted by means of the screws $t'$, that the sleeve Q will strike the said contact strip whenever the wheel P attains any desired velocity, and since the velocity of the said wheel P will depend upon the speed of the car, it will be evident that the position of the two contact pieces T and T' may be so adjusted that contact with the sleeve Q will be made whenever the car attains either one of two predetermined speeds. In the device described with reference to Figs. 1 to 10, this speed is six miles an hour for the contact T, and nine miles an hour for the contact T'; but it will be evident that these contact pieces may be set for any other desired speed, and also that the number of the contact pieces may be increased to any desired number, or decreased to one, as may be desired. These contact pieces T and T' are connected by the wires 6 and 7 respectively, to the indicator shown in detail in Figs. 6 to 8. In these figures K represents a box or frame containing the various parts for operating the indicator. This box is blackened on the interior so as not to show sign when light is out, and is provided with an opaque face $k$ provided with translucent slots $k'$ therein which form some such sign as indicated in Fig 6, where the sign referred to is "This car is running faster than." Below this I provide one or more open spaces $k^2$ to receive the numeral carried by the lever M; and beneath this I preferably have printed in letters always visible "Miles per hour," or some analogous sign. An explanatory sign K' may also be suspended beneath the box K. Within this box K is placed an electric lamp $E^2$ of which the wire 5 from the bell forms the leading in wire, and from which box the wires 6 and 7 lead downward to the contact pieces T and T' as already described. The wire 8 leads from the lamp down to any part of the car not insulated, such for instance as the truck B, and forms with the push button O and spring O', a test circuit.

$E^0$ represents the lamp socket which may be of any well-known or suitable construction.

M represents a lever of conducting material which is pivoted as at $m$ and terminates in a non-conducting handle $m'$. The said lever is also electrically connected to a downwardly projecting arm M' adapted to make connection with the spring O' when the said spring is pressed forward by means of the push button O.

N and N' represent two contact clips connected respectively to the wires 6 and 7. These contact clips, like the lever M are insulated in the box K; and the said lever M is connected to one of the leading-in wires of the lamp, as by means of the wire $m^2$. This lever M carries a curved card $M^2$ having two or more numbers such for instance as 6 and 9, corresponding to the speed of the car to be noted.

It will be seen that if the lever M be in the position shown in Fig. 7, and the wire 5 be connected to the source of electricity, then when the contact is made through the wire 6, the circuit will be open and no signal will be made, while if the contact be made with the wire 7, as by the sleeve Q, then the current will enter the lamp through the wire 5, and passing out through the wire $m^2$, will flow through the lever M, the contact N', and the wire 7 down to the ground, causing the lamp to glow, and illuminating the translucent slots $k'$ in the upper part of the indicator box K, and causing the device to read "This car is running faster than 9 miles per hour."

If the lever M be moved down into the position shown in dotted lines in Fig. 7, the numeral 6 will show through the aperture $k^2$, and the circuit will be closed through the wire 6 whenever the sleeve Q makes contact with the contact piece T.

If, while neither of the wires 6 or 7 are connected with the ground, the push button O be pressed up so as to cause the spring O' to make contact with the arm M', the circuit will be completed from the wire 5 through the lamp $E^2$ out through the wire $m^2$, the arm M', the spring O', and thence by the wire 8 to the ground, thus causing the lamp to illuminate the slots $k'$ and testing whether the apparatus is in working order.

If the wires 3 and 5 (see Fig. 1) be connected together, then the indicator in the box K will operate by itself; but in practice I prefer to place a bell or gong in the circuit so that an audible signal will also be made.

F represents a bell or gong connected by ears $f$, and $f^3$ and the bolts $f^2$ to the side of the car, either inside or outside of the car, and provided with a lug $f'$ adapted to be struck by the hammer $I^2$ connected by means of the bent tongue I' to the armature I, which is normally drawn back by means of the spring $I^3$ adjustably secured to the metallic frame H' carrying the magnet H. The hammer also strikes on the return stroke.

G represents a metallic pin adapted to slide longitudinally in said frame, and provided with annular disks G' and $G^2$, between which disks a pin $i$ of the armature I projects. A spring $h'$ normally insures perfect contact between the sliding pin G and the metallic frame H', and another spring $h$ is adapted to make contact with the end $g$ of the sliding pin G just before the hammer $I^2$ strikes the lug $f'$ and rings the bell. This spring $h$ is connected with the wires 3 and $3^a$, and thus short-circuits the current coming through the wire 3 from the magnet H, and directs it into the frame H', thus demagnetizing the magnet and releasing the armature just before the hammer $I^2$ sounds the gong; but at the same time allowing a continuous current to flow through the wires 3 and 5 into the lamp $E^2$. Thus it will be seen that whenever the circuit is closed by means of any one of the wires 6, 7, and 8, the gong will be intermittently sounded, while the indicator lamp will be continuously illuminated.

It will be seen that the device shown in diagram in Fig. 1, and in detail in Figs. 2 to 10, forms a complete operative system by means of which any excess over either any of two predetermined speeds of the car may be sounded on the ears and flashed on the eyes of the occupants of the car; or either signal may be made of such a nature as to be noticeable to bystanders or other parties interested.

It will be obvious that resistance coils may be substituted for any one or more of the lamps E or E', and also that various modifications of the herein described signal apparatus might be made without departing from the spirit of my invention.

Fig. 11 represents a diagrammatic view of a modified form of the apparatus described with reference to Figs. 1 to 10, and Figs. 12 to 15 represent details of this modified form. In these various figures $E^6$ represents the source of electricity, which may be a battery carried by the car, and provided solely to operate the herein described signal apparatus, or it may be a simple leading-in wire connected with the trolley. In this modified form of apparatus the sleeve represented by $Q^0$ is made elliptical as shown in Fig. 11, and strikes the contact pieces T or T' twice every revolution of the spindle $p$, thus causing a make and break contact between the said sleeve and the said contact piece.

The indicator box K carries a card $k^5$ slotted as at $k^6$, beneath which a card $k^7$ on which any desired signal is printed, such as "This car is running faster than," is moved up and down as will be hereinafter described. This card is secured to the wire $k^8$ which is bent as at $k^9$ to give a bearing on the back of the card, and the said wire is pivotally connected as at $k^{11}$ to the armature $M^4$ of the magnet whose poles are $M^4$ and $M^6$. The back $M^5$ of the magnet is secured to the block $K^2$ inside of the box K. It will be seen that as the magnet becomes magnetized, the armature $M^4$ will be drawn upward carrying with it the wire $k^8$ and card $k^7$, and causing the printing of the said card to appear in the slot $k^6$. It will be seen that at each revolution of the spindle $p$, the circuit through the wire 6 or 7, will be made and broken twice, and that the armature $M^4$ would be released from the magnet and would cause the card $k^7$ and wire $k^8$ to move rapidly up and down were not some provision made for retaining the armature in the upper position. To prevent this dropping down of the armature, I interpose between the coils $M^3$ and the pole $M^7$, and also about the pole $M^6$ I place, copper cylinders $m^6$.

When the electric current is cut off of the wires $M^3$, a comparatively large current is induced by the magnet in these copper cylinders $m^6$, which in turn reacting on the core, causes the magnetism of the core to remain active long enough to hold the card $k^7$ up while the sleeve $Q^0$ revolves from one contact to the next. In this way, the card $k^7$ is sustained in the elevated position during the short time that intervenes between the rapidly recurring contact made by the elliptical sleeve $Q^0$.

The connections of the lever M and of the test wire 8 are similar to those described with reference to Figs. 7 and 8.

The gong shown in Fig. 11 is one of ordinary construction, and differs only from that shown in Fig. 9, in the omission of the sliding rod G and the parts for making contact with and short circuiting through said sliding rod. This modification of the device it will be evident is applicable to street or railway cars of any description whether run by electricity or not, as it is a very simple matter to supply said cars with a battery strong enough to sound the gong F and move the card $k^7$. It will be obvious that in the hereinbefore described apparatus either the bell or the indicator may be cut out of the circuit, leaving the other to operate singly.

Figs. 16 and 17 and 18 and 19 show only modified forms of indicator and apparatus for operating the same but it will be evident that a bell or gong may also be included in the circuit if desired.

In the diagrammatic view shown in Fig. 16 the upper part of said view represents the indicator with the central portion of the face broken away to show the interior mechanism of the same; and the lower part of the said figure represents a section of the device shown in Fig. 17, along the line $z'$ $z'$ of the said figure, and looking in the direction of the arrows. In this form of device the contact-making governor is similar to that already described except that the sleeve Q is provided with an annular knob $Q'$ having a narrow cylindrical surface $q^2$ adapted to strike the contact pieces $T^3$, $T^4$ to $T^{10}$ *seriatim*. These contact pieces are constructed exactly like those already described with reference to Figs. 2 to 5, except that their number is increased, and they are so grouped about the spindle $c$ that the annular knob $Q'$ may first make contact with the contact piece $T^3$, and then before leaving the said contact piece, may lap over and make contact with the next contact piece $T^4$, and passing along the face of this contact piece may make contact with the piece $T^5$ before leaving the piece $T^4$, and so on up to $T^{10}$, always being in contact while the car is moving at an appreciable speed, with not less than one or more than two of these contact pieces. For the purpose of carrying these various contact pieces and their adjusting screws, an insulating disk $P^{12}$, and insulating pieces $P^{11}$ and $P^{13}$ are mounted in the box P', as shown in Fig. 17.

The indicator V shown in the upper part of Fig. 16, has a dial which begins to read at the lowest rate of speed of the car that is to be indicated. Thus suppose the lowest rate of speed to be indicated to be three miles an hour, and the highest rate ten miles an hour, then the face of the indicator would be divided into arcs carrying the numerals 3 to 10. The pointer $V^2$ in the figure is shown at the zero or initial position. This pointer is mounted on a pivoted armature $V'$ normally pressed into the initial position by the weak spring $V^3$ which spring is secured at one end to the pivot $V^0$ of the armature, and at the other to a stud $V^4$ in the face of the dial. This stud also limits the outward travel of the pointer-bearing armature, and causes it to stop at the highest point of the indicated speed, and insures its returning to the zero position by traveling backward over the face of the dial. This armature $V'$ is drawn around by the magnets $v^3$, $v^4$, to $v^{10}$. These magnets are connected by the wires $3^e$, $4^e$, to $10^e$ to the contact pieces $T^3$, $T^4$, to $T^{10}$, and thus the circuit is closed through the wire 5 connected to the source of electricity, the magnet, the wire leading to the contact piece, and the ground as hereinbefore described.

It will be evident that when the knob $Q'$ is in contact with two of the contact pieces, that two of the magnets will be magnetized, but the armature will remain in the magnet first reached, until that magnet be cut out of the circuit by the increasing speed of the car, when the armature will jump to the next higher magnet, and so on as the speed of the car increases. As the speed of the car decreases, the armature will be drawn back one magnet at a time.

It will be evident that the contact pieces $T^3$ to $T^{10}$ may be set so as to be in the line of travel of the knob $Q'$, and to be struck by said knob when the car reaches a speed of from three to ten miles an hour, or any other predetermined speed. It will also be evident that the number of the contact pieces, and the corresponding number of numerals on the face of the dial may be increased or diminished as desired.

In the device shown in Figs. 18 and 19, the indicator box K is provided with two slots $k^{16}$ and $k^{17}$ in the face thereof, and signs $k^{18}$ and $k^{19}$ printed on the face of the card. The contact pieces T and T' and the sleeve Q and knob $Q'$ are similar to those described with reference to Fig. 17, except that there are only two of the said contact pieces. The electricity enters through the wire 5 and passes through one of the wires $5^a$ or $5^b$ into one of the magnets $M^8$ or $M^9$ from which it is carried by the wire 6 or 7 to the ground, as already described with reference to the other figures. The magnet M⁸ is adapted to attract an armature M¹¹ pivoted at $m^{11}$ and normally supported clear of the magnet by means of the spring M¹³. The outer end of this armature carries an arc $m^{12}$ on which the numeral indicating the speed of the car is printed. The numeral 6 shown in Fig. 19, represents six miles an hour, and the numeral 9 represents nine miles an hour. The magnet M⁹ in a similar way attracts the armature M¹² pivoted at $m^{14}$ and provided at its inner end with an arc $m^{15}$, carrying the speed-indicating numeral 9. In the view shown in Fig. 19, the magnet M⁹ is cut out, and the numeral 9 is hidden behind the upper part of the face of the indicator box. The magnet, M⁸ is in circuit, and the armature M¹¹ is drawn down against the action of its spring M¹³ so as to show the numeral 6 in the slot of the indicator card, as is shown in Fig. 18. It will be obvious that the number of these speed indicating armatures, and of the corresponding contact making devices in the box P' may be varied at will, and thus any desired number of speeds may be indicated. These represent a few means of carrying out the fundamental idea of my invention, but it will be obvious that various alterations in and modifications of the herein described devices might be made which could be used without departing from the spirit of my invention.

Having thus described my invention, what I claim, and desire to secure by Letters Patent of the United States, is—

1. In a speed signaling apparatus for use on wheeled vehicles, the combination with a wheel revolving at a speed proportional to that of the vehicle, of a speed governor operated by said wheel, a source of electricity, an electric circuit, and a contact making device operated by the said governor, an electro magnet mounted in said circuit, an armature adapted to be drawn to said magnet, a spring normally withdrawing said armature, a hammer connected to said armature, a gong adapted to be struck by said hammer, a sliding bar adapted to be moved by said armature; and contact pieces adapted to be struck by said bar and to cut said magnet out of said circuit as said hammer nears the end of its stroke, substantially as described.

2. In a speed signaling apparatus for use on wheeled vehicles, the combination with a wheel revolving at a speed proportional to that of the vehicle, of a speed governor operated by said wheel, a source of electricity, an electric circuit, and a contact making device operated by the said governor, an electro magnet mounted in said circuit, an armature adapted to be drawn to said magnet, a spring normally withdrawing said armature, a hammer connected to said armature, a gong adapted to be struck by said hammer, a sliding bar movable in a direction approximately parallel to the plane of motion of said armature, a contact piece connected to the wire wound upon said electro-magnet and adapted to be struck by said bar as said magnet nears the end of its travel, and projections upon said bar adapted to engage said armature, substantially as and for the purposes described.

3. In an electric bell or gong, the combination with an electro magnet having the conducting wire wound thereon, and a contact piece electrically connected to the said wire exterior to the coil on the magnet, of a sliding bar adapted to make contact with said contact piece, electrical connections between said bar and the electric conducting circuit, and an armature connected to said bar and adapted to be drawn to said magnet, and simultaneously to move said bar into contact with said contact piece, and a hammer moved by said armature, substantially as and for the purposes described.

4. In an electric bell or gong, the combination with an electro-magnet H having the conducting wire 3 wound thereon, and a contact spring $h$ electrically connected to the said wire exterior to the coil on the magnet, of a sliding bar G provided with projections G' and G², the armature I having a lug $i$ adapted to engage between said projections G' and G², electrical connections between said bar and the electric conducting circuit; and the hammer I² connected to said armature I and moved thereby, substantially as and for the purposes described.

5. In a speed signaling apparatus for use on wheeled vehicles, the combination with a wheel operated by the motion of the vehicle, of a speed governor operated by said wheel, a source of electricity, an electric circuit, and a contact making device operated by the said governor, an electro magnet mounted in said circuit, an armature adapted to be drawn to said magnet, a spring normally withdrawing said armature, a signal card connected to said armature, and a fixed slotted screen in front of said signal card, substantially as described.

6. An indicator for use in apparatus of the character described, consisting essentially of an electro-magnet, an armature adapted to be drawn thereto, a bent wire with guides therefor pivotally attached to said armature, a light signal card carried by said wire, and a fixed slotted screen in front of said signal card, substantially as and for the purposes described.

7. In an electric indicator, the combination with an electro-magnet and means for rapidly making and breaking the electrical circuit through the winding thereof, of a metallic cylinder surrounding the poles of the core of said magnet and between said core and said winding, an armature adapted to be drawn to said magnet, a bent wire pivotally secured to said armature, a signal card fast to said wire, and a fixed slotted screen in front of said signal card, substantially as described.

8. In an apparatus of the character described, the combination with a track, of a wheeled vehicle mounted thereon, an auxiliary wheel carried beneath said vehicle and traveling along said track, a spring pressing said wheel on said track, a shaft rigidly attached to said wheel and forming the journal thereof, a centrifugal governor mounted on said shaft, an electric contact making device operated by said governor, and electric signaling apparatus operated by said contact making device, substantially as described.

9. In an apparatus for signaling the speed of railway cars, the combination with a wheel made of conducting material carried by the car and revolving in contact with the rail; of a shaft forming the journal for said wheel and in electrical connection therewith; a speed governor mounted on said shaft and operated by said wheel, a contact making device also mounted on said shaft and in electrical connection therewith, and operated by said governor, a source of electricity, and an electric circuit and electric signaling apparatus operated by said contact making device, substantially as described.

10. In an apparatus for signaling the speed of railway cars, the combination with a shaft journaled beneath the car, a wheel fast on said shaft and revolved by contact with the rail, a centrifugal governor mounted on said shaft, a contact sleeve mounted on said shaft and moved longitudinally thereon by said governor, electric contact strips adapted to be touched by said contact sleeve in its longitudinal motion on said shaft, and an electric circuit and signaling apparatus connected to said contact strips, substantially as described.

11. In an apparatus for signaling the speed of vehicles, the combination with a wheel revolved by the motion of the vehicle, a shaft rigidly attached to said wheel, a conducting sleeve revolving with said shaft, and longitudinally movable thereon; a speed governor pivotally mounted on said shaft and adapted to move said sleeve longitudinally thereon, a circuit closing device electrically connected to the source of electricity and adapted to be touched by said sleeve at a given point of its travel, and thus to complete the circuit; and electric signaling apparatus operated by said circuit closing device, substantially as and for the purposes described.

12. In an apparatus for signaling the speed of vehicles, the combination with a wheel revolved by the motion of the vehicle, a shaft rigidly attached to said wheel, a conducting sleeve revolving with said shaft, and longitudinally movable thereon, a speed governor pivotally mounted on said shaft and adapted to move said sleeve longitudinally thereon, an insulated circuit closing device adjustably mounted in juxtaposition to said sleeve and adapted to be touched by said sleeve at any desired portion of its travel, and thus to complete the circuit, a source of electricity carried by or connected to said vehicle, electrical conductors from said circuit closing device to said source of electricity, and electric signaling apparatus operated by said circuit closing device, substantially as and for the purposes described.

13. In an apparatus of the character described, the combination with a vehicle, and electric signaling apparatus mounted thereon, of a wheel revolving with a velocity proportional to the speed of said vehicle, a shaft fast to said wheel, a speed governor pivotally mounted on said shaft, a sleeve also mounted on said shaft and revolving therewith and moved longitudinally by said governor, an insulated adjusting screw and an insulated electric contact making device adjustably mounted on said screw and adapted to be touched by said sleeve at any desired point of its travel, substantially as and for the purposes described.

14. In an apparatus of the character described, the combination with a vehicle, and electric signaling apparatus mounted thereon, of a wheel revolving with a velocity proportional to the speed of said vehicle, a shaft fast to said wheel, a conducting sleeve mounted on and revolving with said shaft and longitudinally movable thereon; a centrifugal governor also mounted on said shaft and adapted to move said sleeve longitudinally; an electric circuit closing device adapted to be touched by said sleeve at any desired point of its travel, and so close said circuit, and means for adjusting the position of said circuit closing device relative to the travel of said sleeve, substantially as and for the purposes described.

15. In an electric speed signaling apparatus, the combination with a speed governor and a revoluble and longitudinally movable electric circuit closer operated thereby; of a contact strip in the form of a bell-crank lever, the outer arm being adapted to touch the movable circuit closer; a fixed stop for the inner arm; a spring normally holding said inner arm against said stop; and electric signaling apparatus electrically connected to said contact strip, substantially as described.

16. In an electric speed signaling apparatus, the combination with a speed governor, and a revoluble and longitudinally movable electric circuit closer operated thereby; of a bell-crank lever of conducting material screw threaded at its pivot and having one arm adapted to engage said movable circuit closer, a fixed stop, a spring normally compressing the other arm of said bell-crank lever against said fixed stop, an adjusting screw engaging in said screw threads and forming the pivot for said bell-crank lever whereby its position relative to the travel of said circuit closer may be varied at will, and electric signaling apparatus connected to said bell crank lever, substantially as and for the purposes described.

17. In an electric speed signaling apparatus, the combination with a speed governor of a longitudinally movable circuit closer operated thereby, a plurality of contact making devices concentrically arranged about said circuit closer, and at intervals along the line of travel thereof, and an independent electric signal connected to and operated by each of said contact making devices, substantially as described.

18. In an electric speed signaling apparatus the combination with a speed governor, of a longitudinally movable electric circuit closer operated thereby, a ring concentric with said circuit closer, and exterior thereto, a plurality of bell crank levers made of conducting material pivoted in said ring and at different distances along the length thereof, the inner arm of each of said bell crank levers extending inward across the line of travel of said circuit closer, and the outer arm engaging against the inner face of said ring, springs normally holding said outer arm against said ring, and electric signals connected to and operated by said bell-crank levers, substantially as and for the purposes described.

19. In an electric speed signaling apparatus, the combination with a speed governor, of a longitudinally movable electric circuit closer operated thereby, a ring concentric with said circuit closer and exterior thereto, a plurality of bell crank levers made of conducting material insulated from each other and from said ring, adjustable insulated screws forming the pivots of said bell-crank levers, and adapted to adjust the same at any desired position relative to the axial length of said ring, the inner arm of each of said bell crank levers extending inward across the line of travel of said circuit closer, and the outer arm engaging against the inner face of said ring, springs normally holding said outer arm against said ring, and electric signals connected to and operated by the respective bell crank levers, substantially as described.

20. In an electrical speed signaling apparatus the combination with a speed governor, of a conducting sleeve revolving therewith and longitudinally moved thereby, and adapted to close the circuit, a ring concentric with said sleeve, and exterior thereto, a plurality of bell crank levers made of conducting material pivoted in said ring and at different distances along the length thereof, the inner arm of each of said bell crank levers extending inward across the line of travel of said sleeve, and the outer arm engaging against the inner face of said ring, springs normally holding said outer arm against said ring, and electric signals connected to and operated by said bell-crank levers, substantially as and for the purposes described.

21. In an electric speed signaling apparatus, the combination with a speed governor, of a conducting sleeve revolving therewith and longitudinally moved thereby, and adapted to close the circuit, a ring concentric with said sleeve and exterior thereto, a plurality of bell crank levers made of conducting material insulated from each other and from said ring adjustable insulated screws forming the pivots of said bell-crank levers, and adapted to adjust the same at any desired position relative to the axial length of said wing, the inner arm of each of said bell crank levers extending inward across the line of travel of said sleeve, and the outer arm engaging against the inner face of said ring, springs normally holding said outer arm against said ring, and electric signals connected to and operated by the respective bell crank levers, substantially as described.

22. In a speed signaling apparatus, the combination of a driven shaft, a frame rigidly attached thereto; bell crank levers pivoted in said frame and provided with weights on one arm, and springs for drawing said weighted arms together and a conducting circuit closing sleeve mounted on said shaft and engaging the opposite arms of said bell crank levers, whereby said sleeve is thrust forward when said weights are thrown outward, an electric contact strip placed across the line of travel of said sleeve, and electric signaling apparatus connected to and operated by said contact strip, substantially as described.

23. In a speed signaling apparatus, the combination of a driven shaft, a frame rigidly attached thereto; bell crank levers pivoted in said frame and provided with weights on one arm, and springs for drawing said weighted arms together and a conducting circuit closing sleeve mounted on said shaft and engaging the opposite arms of said bell crank levers, whereby said sleeve is thrust forward when said weights are thrown outward, a plurality of electric contact strips placed across the line of travel of said sleeve, at various portions thereof, and electric signaling apparatus connected to and operated by said contact strips, substantially as described.

24. In a speed signaling apparatus, the combination of a driven shaft, a frame rigidly attached thereto; bell crank levers pivoted in said frame and provided with weights on one arm, and adjustable springs for drawing said weighted arms together and a conducting circuit closing sleeve mounted on said shaft and engaging the opposite arms of said bell crank levers, whereby said sleeve is thrust forward when said weights are thrown outward, an electric contact strip placed across the line of travel of said sleeve, and electric signaling apparatus connected to and operated by said contact strip substantially as described.

25. In a speed signaling apparatus, the combination of a driven shaft, a frame rigidly attached thereto; bell crank levers pivoted in said frame and provided with weights on one arm, and adjustable springs for drawing said weighted arms together and a conducting circuit closing sleeve mounted on said shaft and engaging the opposite arms of said bell crank levers, whereby said sleeve is thrust forward when said weights are thrown outward, a plurality of electric contact strips placed across the line of travel of said sleeve, at various portions thereof, and electric signaling apparatus connected to and operated by said contact strips, substantially as described.

In testimony whereof I affix my signature in presence of two witnesses.

JOHN W. DARLEY, JR.

Witnesses:
WM. G. MESSERSMITH,
A. WAGNER.